United States Patent
Palmeri

[11] Patent Number: 5,946,972
[45] Date of Patent: Sep. 7, 1999

[54] AVAILABLE SPEED RATIO MODIFICATION FOR SPLITTER TRANSMISSION

[75] Inventor: Frank A. Palmeri, Troy, Mich.

[73] Assignee: Meritor Heavy Vehicle Systems, LLC

[21] Appl. No.: 08/948,343

[22] Filed: Oct. 9, 1997

[51] Int. Cl.[6] .................................................. F16H 59/00
[52] U.S. Cl. .............................. 74/335; 74/473.3; 701/53
[58] Field of Search ................................. 74/335, 473.12, 74/473.3; 477/111; 701/52, 53, 51

[56] References Cited

U.S. PATENT DOCUMENTS

| | | | |
|---|---|---|---|
| 5,435,212 | 7/1995 | Menig | 74/335 |
| 5,591,102 | 1/1997 | White et al. | 74/335 X |
| 5,638,271 | 6/1997 | White et al. | 701/64 |
| 5,650,932 | 7/1997 | Chan et al. | 701/62 |
| 5,729,454 | 3/1998 | Amsallen | 74/335 X |
| 5,755,639 | 5/1998 | Genise et al. | 477/111 |

Primary Examiner—Dirk Wright
Assistant Examiner—Peter T. Kwon

[57] ABSTRACT

A multi-speed transmission has a main transmission section and a splitter section. The electronic control for this transmission is operable to either provide the actuation of the splitter system or not allow that actuation. Thus, the operator of the vehicle is able to request either a smaller number of available speed ratios or a larger number of available speed ratios by selecting the appropriate electronic control. The vehicle manufacturer is able to tailor the vehicles to have a transmission which is appropriate to the needs of its customer without having to change the transmission. Moreover, upon resale, a transmission that was initially provided with only a smaller number of speeds may be easily upgraded to provide additional speeds. In a second embodiment of this invention, the control is reprogrammable to either provide or not provide actuation of the splitter gear. The control may be actuated remotely, such as by a satellite, to provide the additional speed ratios based upon expected driving conditions.

13 Claims, 1 Drawing Sheet

5,946,972

AVAILABLE SPEED RATIO MODIFICATION FOR SPLITTER TRANSMISSION

BACKGROUND OF THE INVENTION

This application relates to a multi-speed vehicle transmission wherein the electronic control unit drives actuators for achieving operator selected shifts. The electronic control is either re-programmed or replaced to modify the number of available speed ratios within the transmission.

Multi-speed transmissions for use in heavy vehicles are becoming more and more complex. Some drivers desire fine gradations in the speed ranges available to them. Thus, there are truck transmissions in service that provide 18 different speeds to a driver. At the same time, other drivers may not wish to have such a wide range of speed ratios. The number of different speed ratios does not effect the available speed provided to the output of the vehicle. Instead, additional speed ratios provides additional fractional increments of the maximum vehicle speed ratio.

The typical 18-speed truck transmission includes a main transmission gear box which would have five different selectively engagable gears to provide five different basic speed ratios. A range section then modifies those five different speeds between a high and a low range to double the number of available speeds. Thus, in transmissions having five main gears and a high/low range box, there are actually ten available speed ratios.

Another transmission option is the use of a splitter gear. The splitter gear provides effectively the opposite of the range box. That is, the splitter gear splits the speed ratios between each of the five main gears in the main transmission. In this way, the splitter also doubles the number of available speed ratios.

In some driving applications, it may be desirable to have more speed ratios. As an example, when driving through mountains some drivers may wish to have more available speed ratios. On the other hand, the increased number of speed ratios may be undesirable during flat landscape driving situations. Moreover, some drivers simply do not wish to have 18 available speeds as it may complicate shifting between the speeds.

Thus, at present, truck drivers may purchase a truck having only a ten-speed transmission if the particular truck owner only desires ten available speeds. At resale time, this may limit the resale value of the truck as it would be attractive to a truck owner desiring 18 available speeds.

Moreover, it is difficult for a vehicle manufacturer to tailor the number of available speeds to the individual customer. Changing the number of available speeds effectively requires changing the type of transmission incorporated into the vehicle. That is, a truck manufacturer may have one customer that only wants ten available speeds and a second customer that would like 18 available speeds. Until now, the only way of achieving this option would be to provide different transmissions in those vehicles.

SUMMARY OF THE INVENTION

In a disclosed embodiment of this invention, a transmission having a plurality of available speed ratios is of the so-called "shift-by-wire" type wherein actuators are driven to achieve the speed ratios. An operator requests an upshift or a downshift, and the control is then operable to actuate the appropriate actuator and shift the transmission speed ratio. The associated controls and safeguards for such systems are generally known in the art. One preferred system is disclosed in co-pending U.S. patent application Ser. No. 08/650,749, now U.S. Pat. No. 5,741,202 owned by the Assignee of the present application.

The electronic control may be modified to change the number of available speed ratios that can be actuated in response to a request to change the speed ratio. In one embodiment, a dedicated electronic control may be incorporated into the system, and may be operable to only provide for ten speed ratios. As an example, in the general type of transmission disclosed above, wherein there is a main transmission section, a range section, and a splitter section, the electronic control for only providing ten speeds may not be programmed to operate the splitter section. Thus, the splitter function is never actuated and only ten speeds are provided. However, that electronic control is removable and replaceable such that a new control can be inserted which does actuate the splitter section, and thus provides 20 available speeds.

In another embodiment, the electronic control may be operable to only provide the ten available speeds under certain conditions. However, if the vehicle is approaching an area wherein it would be desirable to have additional speed ratios based on the expected driving conditions, the electronic control can be reprogrammed to make the additional speed ratios available. As one example, global positioning systems are known wherein satellites communicate with trucks on the road. If the global positioning system recognizes that a truck is approaching a mountainous area, than that satellite could send a signal to the electronic control on the truck which would reprogram the control to begin actuating the splitter gear and provide the additional speed ratios. The technology necessary to achieve this function is available in the art. It is the function itself which is the patentable feature of this aspect of the invention.

By providing the ability to change the electronic control, the present invention allows the vehicle manufacturer to tailor a vehicle to the particular customer's desires. Moreover, the vehicle may be easily "upgraded" to provide additional available speeds. Finally, with the reprogrammable embodiment, the truck's operating abilities can be specifically tailored to the expected driving conditions for the truck.

DETAILED DESCRIPTION OF THE PREFERRED EMBODIMENT

Figure 1:
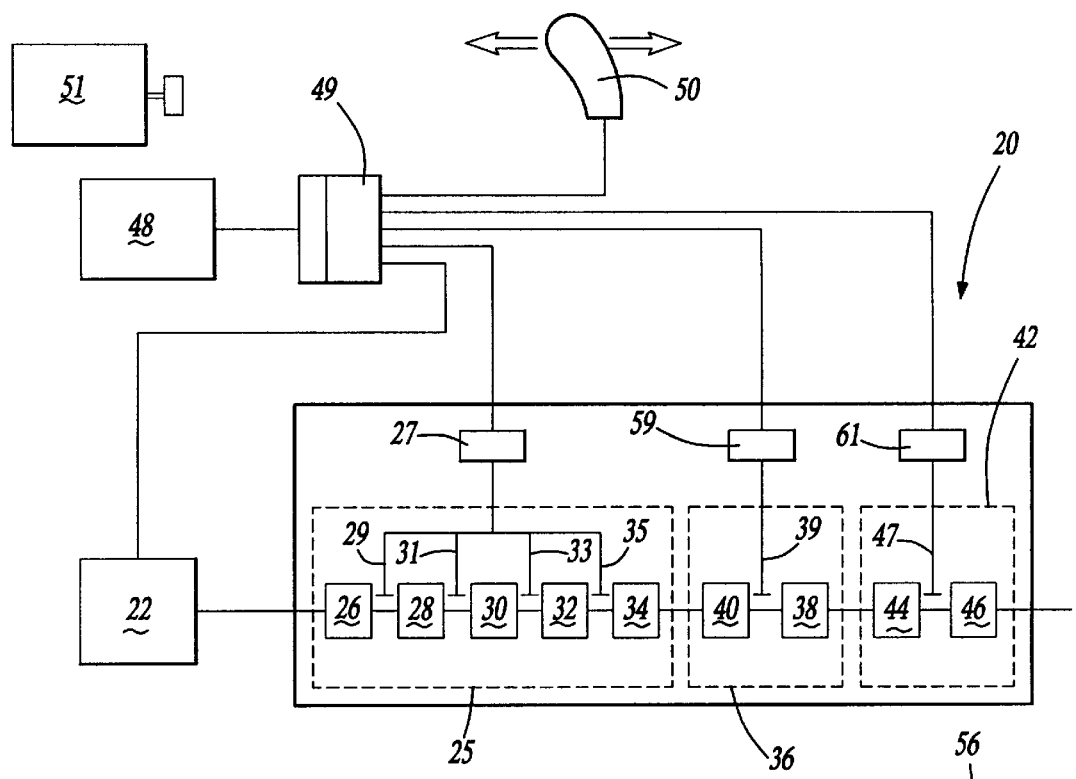
FIG. 1 is a highly schematic view of a transmission and engine control according to the present invention.

A transmission and engine system 20 is illustrated in FIG. 1 having an engine 22 driving a transmission 24. Transmission 24 is of the multi-speed type, and is operable to provide a number of incremental speed ratios to modify the input speed from the engine. It must be emphasized that the structure of the transmission is not as illustrated in FIG. 1. Rather, FIG. 1 is merely a schematic representation of the types of functions that are ongoing within the transmission. The present invention does not propose to modify the structure of the transmission itself, and the schematic representation of FIG. 1 is best suited for an understanding of this invention.

In a typical transmission, there are plural gear ratios provided within a main transmission section 25. Five gears 26, 28, 30, 32 and 34 are illustrated and provide different fractions of modification to the input speed from the engine 22.

In addition, a range function 36 has a high range gear 38 and a low range gear 40. The range gears effectively provide a multiple of the five gears in the main transmission box 25. Again, the schematic illustration of FIG. 1 does not illustrate how this is achieved, however, the way the transmissions provide a range function is well known in the art. Thus, between the main transmission section 25 and the range section 36 there are ten available speeds.

A second modification to the ten speeds is provided by a splitter gear 42. Splitter gear 42 effectively connects the output between one of two gears 44 and 46. The splitter gear thus splits between the five main gears 26, 28, 30, 32 and 34. As an example, and as shown in FIG. 1, when the transmission range box is in low range 40, and in the first gear 26, then first speed is provided. The splitter gear is then operable to provide a second speed that is midway between the first and second gears 26 and 28. After second speed is achieved through moving the splitter gear, the splitter gear is returned to its nominal position and the gear 28 is engaged to achieve third speed. This process continues with the splitter gear providing an additional increment between each of the main gears 26, 28, 30, 32 and 34.

As shown in FIG. 1, there are a number of shift rails 29, 31, 33, 35, 39 and 47 between gears. Main actuator 27 range actuator 59 and splitter actuator 61 are operable to move the rails and engage selected ones of the gears to provide the desired speed ranges. Essentially, the drive train passes through one of gears 26, 28, 30, 32, 34, one of gears 38 and 40, and one of gears 44 and 46.

An electronic control 48 is shown having a replaceable connection 49 to communicate with the actuators 27, 59 and 61. Connection 49 should be understood as merely representing the fact that the electronic control 48 may be easily removed from the system to be changed. An operator input switch 50 allows an operator to provide an indication of whether an upshift or a downshift is desired from the currently engaged transmission speed ratio. The electronic control is operable to take in that desired upshift or downshift, also take in various vehicle characteristics such as engine speed, transmission output speed, etc. and then is operable to engage the appropriate shift actuator and control the engine speed to achieve a shift from the engaged transmission speed ratio to a desired ratio. The basic system for actuating the engaged speed ratios may be as disclosed generally in U.S. patent application Ser. No. 08/650,749 which is assigned to the Assignee of the present invention. However, the details of this system are not as important as the fact that a basic transmission shifting system be provided having the ability to take an operator's input and then drive the transmission gears into the appropriate engaged position.

As shown in FIG. 1, a replaceable ECU 51 may be plugged into connection 49. Now, assuming that the first operator who purchases the vehicle incorporating system 20 only desires ten speeds, electronic control 48 is programmed to not have the capability of actuating actuator 61. Thus, the splitter gear cannot be actuated to split between the various speed ratios. In the example given in FIG. 1, only speeds 1, 3, 5, 7, 9, 11, 13, 15 17 and 19 would thus be provided. It should be understood that the operator of that vehicle would see those speed ratios as 1–10, rather than the spaced odd numbers.

If the operator of the vehicle then decides to sell the vehicle, or if alternatively, the original purchaser of the vehicle does desire that all 20 speed ratios be made available, then ECU 51 is plugged into connection 49. ECU 51 has the ability to actuate actuator 61, and thus is able to achieve all 20 of the speed ratios listed in FIG. 1.

The vehicle manufacturer, or the operator is thus able to easily tailor the available speeds to the specific desires of the operator of that vehicle. The manufacturer need not provide different transmissions to achieve different available speed ratios. Also control of available speed ratios beyond simply allowing or not allowing the splitter function may be provided.

Figure 2:
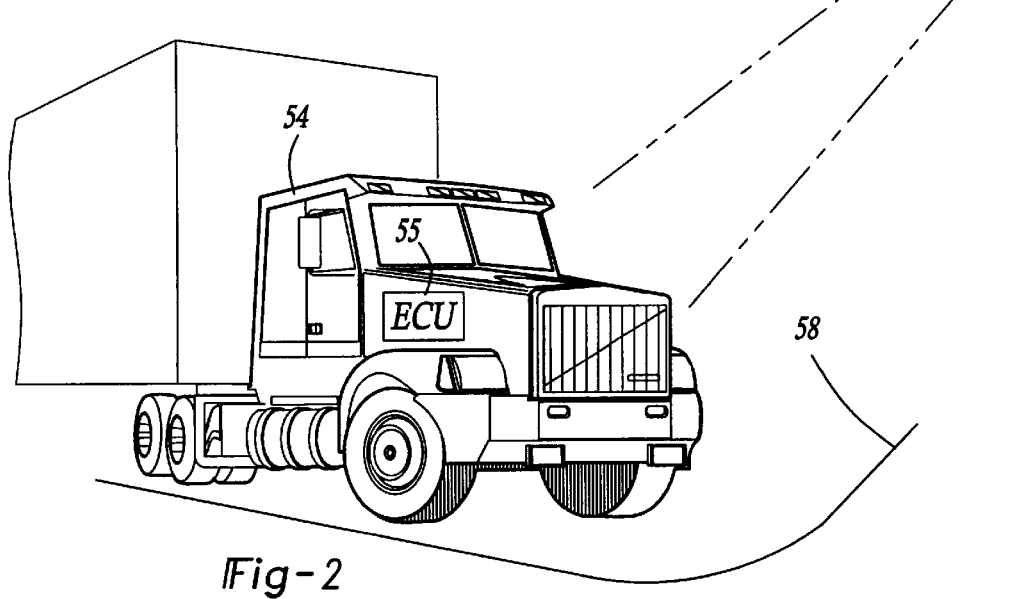
FIG. 2 is a schematic view of one embodiment of the present invention.

FIG. 2 shows a second embodiment wherein a vehicle 54 is equipped with a reprogrammable electronic control 55. The electronic control 55 is similar to the controls 48 and 51 as shown in FIG. 1, however, electronic control 55 is operable to be switched on or off to have the ability to actuate actuator 61. A satellite 56 is shown which may be of the type incorporated into global positioning systems which communicate with vehicles such as vehicle 52 while on the road. If a control base determines that it would be desirable to provide the additional speed ratios based on expected driving conditions, then the electronic control is provided with a signal to reprogram itself and provide the ability to actuate actuator 61. As one example, when the vehicle 52 is approaching a mountainous area such as mountain 58, the satellite control 56 may determine that the additional speeds would be valuable and would thus instruct ECU 54 to reprogram itself to provide the ability to actuate actuator 61. Alternatively, the reprogramming can be done at the vehicle by providing some ability to reprogram the control at the vehicle. The technology to achieve this function is available. It is the function which is inventive.

In summary, the present invention provides the ability to specifically tailor the number of speed ratios available from a vehicle to meet the needs of the operator of the vehicle. The number of available speeds may be changed by simply changing the electronic control, or the control may be reprogranmned.

Preferred embodiments of this invention have been disclosed, however, a worker of ordinary skill in the art would recognize that certain modifications would come within the scope of this invention. For that reason the following claims should be studied to determine the true scope and content of this invention.

I claim:

1. A multi-speed transmission comprising:
    a plurality of selectively engagable gears in a main section, said selectively engagable gears being operable to provide a plurality of different speed ratios;
    a splitter gear for providing the ability to split between said plurality of gears and provide additional speed ratios;
    an electronic control for receiving an operator input and providing appropriate signals to an actuator for selectively engaging one of said plurality of selectively engagable gears to achieve a speed ratio desired by an operator; and
    wherein said electronic control is modified, such that said control cannot actuate said splitter gear regardless of the operator input.

2. A transmission as recited in claim 1, wherein said multi-speed transmission also includes a range box for providing high and low ranges to modify the speed ratios provided by said plurality of gears.

3. A multi-speed transmission comprising:
    a plurality of selectively engagable gears in a main section, said selectively engagable gears being operable to provide a plurality of different speed ratios;

a splitter gear for providing the ability to split between said plurality of gears and provide additional speed ratios;

an electronic control for receiving an operator input and providing appropriate signals to an actuator for selectively engaging one of said plurality of selectively engagable gears to achieve a speed ratio desired by an operator;

wherein said electronic control may be changed to selectively allow or not allow actuation of said splitter gear; and said electronic control may be replaced by a second electronic control to either provide or not provide the ability to actuate said splitter gear.

4. A multi-speed transmission comprising:

a plurality of selectively engagable gears in a main section, said selectively engagable gears being operable to provide a plurality of different speed ratios;

a splitter gear for providing the ability to split between said plurality of gears and provide additional speed ratios;

an electronic control for receiving an operator input and providing appropriate signals to an actuator for selectively engaging one of said plurality of selectively engagable gears to achieve a speed ratio desired by an operator;

wherein said electronic control may be changed to selectively allow or not allow actuation of said splitter gear; and said electronic control is reprogrammable to provide or not provide the ability to actuate said splitter gear.

5. A transmission as recited in claim 4, wherein said electronic control is operable to receive a signal from a remote signalling device to cause said reprogranmning.

6. A method of providing a multi-speed transmission in a vehicle comprising the steps of:

1) providing a multi-speed transmission having a plurality of selectively engagable gears, an actuator system for selectively engaging one of said plurality of gears, and an electronic control for controlling said actuator system;

2) determining the number of desired speed ratios for a particular vehicle; and 3) changing an electronic control to provide the number of desired speed ratios.

7. A method as recited in claim 6, wherein a splitter gear is provided for splitting between the speed ratios provided by said plurality of said selectively engagable gears, and an actuator be provided for said splitter gear, the changing of step 3 being provided by allowing or not allowing said control to actuate said actuator for said splitter gear.

8. A method as recited in claim 7, wherein said electronic control is not operable to actuate said actuator for said splitter gear.

9. A method as recited in claim 6, wherein the determination of how many speed ratios to provide in the particular transmission is made based upon the desires of the customer for the vehicle.

10. A method as recited in claim 6, wherein said electronic control is reprogrammed based upon remote signals.

11. A method as recited in claim 10, wherein said reprogramming is performed.

12. A method as recited in claim 10, wherein said reprogramming is directed based upon expected driving conditions.

13. A method of controlling a transmission comprising the steps of:

1) providing a multi-speed transmission having a main transmission section with a plurality of selectably engagable gears, an actuation structure for actuating said gears based upon control inputs from an operator, providing a splitter gear for splitting between said plurality of gears, and an actuator for selectively switching said splitter gear, and providing electronic control which is reprogrammnable to either allow or not allow actuation of said actuator for said splitter gear; and 2) providing a signal to said electronic control to either provide or not provide actuation of said actuator for said splitter gear based upon expected driving conditions.

* * * * *